US012436505B2

(12) United States Patent
Vago et al.

(10) Patent No.: US 12,436,505 B2
(45) Date of Patent: Oct. 7, 2025

(54) ELECTRONIC WATCH FOR SPACE AND/OR SURFACE EXPLORATION

(71) Applicant: EUROPEAN SPACE AGENCY (ESA), Noordwijk (NL)

(72) Inventors: Jorge Luis Vago, Noordwijk (NL); Poulakis Pantelis, Noordwijk (NL)

(73) Assignee: EUROPEAN SPACE AGENCY (ESA), Noordwijk (NL)

( * ) Notice: Subject to any disclaimer, the term of this patent is extended or adjusted under 35 U.S.C. 154(b) by 440 days.

(21) Appl. No.: 17/920,568

(22) PCT Filed: Apr. 22, 2020

(86) PCT No.: PCT/EP2020/061140
§ 371 (c)(1),
(2) Date: Oct. 21, 2022

(87) PCT Pub. No.: WO2021/213640
PCT Pub. Date: Oct. 28, 2021

(65) Prior Publication Data

US 2023/0152752 A1 May 18, 2023

(51) Int. Cl.
*G04G 9/00* (2006.01)

(52) U.S. Cl.
CPC .................................. *G04G 9/0076* (2013.01)

(58) Field of Classification Search
CPC .................................................... G04G 9/0076
USPC ............................................................ 368/21
See application file for complete search history.

(56) References Cited

U.S. PATENT DOCUMENTS 5,408,444 A 4/1995 Kita et al.
7,688,682 B2 3/2010 Clervoy
2008/0130418 A1 * 6/2008 Clervoy ................. G04F 1/005 368/21

(Continued)

FOREIGN PATENT DOCUMENTS

CA 2966272 11/2018
CN 101206118 6/2008

(Continued)

OTHER PUBLICATIONS

RU Application No. 2021129998/28, Decision to Grant, Apr. 12, 2024.

(Continued)

*Primary Examiner* — Edwin A. Leon
*Assistant Examiner* — Kevin Andrew Johnston
(74) *Attorney, Agent, or Firm* — Nixon & Vanderhye, P.C.

(57) ABSTRACT

An electronic watch may be provided having functionality for space exploration and/or surface exploration on a terrestrial planet. The watch may comprise a time displaying means and a processor subsystem. The processor subsystem may be configured to maintain a coordinated planetary time of a terrestrial planet, obtain longitudinal data representing a longitude of interest on the terrestrial planet which is different from the planet's prime meridian, determine a local true solar time, LTST, at the longitude of interest as a function of the coordinated planetary time and using an equation of time which accounts for orbital eccentricity and rotational axis tilt of the terrestrial planet, and to control the time displaying means of the electronic watch to display the LTST.

15 Claims, 6 Drawing Sheets

(56) References Cited

U.S. PATENT DOCUMENTS

| | | | | |
|---|---|---|---|---|
| 2012/0310427 | A1* | 12/2012 | Williams .......... | H02J 13/00028 702/182 |
| 2013/0000134 | A1* | 1/2013 | Keele ..................... | G04B 49/04 33/270 |
| 2015/0227115 | A1* | 8/2015 | Dietz ................... | G04G 9/0076 368/21 |
| 2017/0093451 | A1* | 3/2017 | Chen .................... | G04G 21/025 |
| 2020/0033808 | A1* | 1/2020 | Bonnet .................. | G04B 49/00 |

FOREIGN PATENT DOCUMENTS

| | | | | |
|---|---|---|---|---|
| CN | 109104261 | | 12/2018 | |
| DE | 20111812 | | 10/2001 | |
| DE | 20111812 | U1 * | 10/2001 | ............. G04B 19/26 |
| JP | 2015-108531 | | 6/2015 | |
| RU | 2685764 | | 4/2019 | |

OTHER PUBLICATIONS

International Search Report and Written Opinion of the ISA for PCT/EP2020/061140, mailed Dec. 4, 2020, 10 pages.
M. Allison et al, “A post-Path®nder evaluation of areocentric solar coordinates with improved timing recipes for Mars seasonal/diurnal climate studies”, Planetary and Space Science 48, (2000) pp. 215-235.
The Omega Speedmaster Skywalker X-33 watch, 19 pages.
V.A. Zharov, ISBN 5-85099-168-9 (2006).

* cited by examiner

ELECTRONIC WATCH FOR SPACE AND/OR SURFACE EXPLORATION

This application is the U.S. national phase of International Application No. PCT/EP2020/061140 filed Apr. 22, 2020, which designated the U.S., the entire contents of which is hereby incorporated by reference.

FIELD OF THE INVENTION

The invention relates to an electronic watch having functionality for space exploration and/or surface exploration on a terrestrial planet.

BACKGROUND ART

The clock for timekeeping is one of the oldest human inventions. Clocks were previously purely mechanical devices, but modern clocks are often at least in part electronically driven. For example, an electronic clock may comprise an electronic display and a processor configured to display certain information on the display. Such information may include the time but also other types of information, such as a date, time in another time zone, a barometric reading, etc. It is also known to have part-mechanical, part-electronic clocks, which may for example comprise a clock face with physical hands which may be electronically controlled by the processor.

Timekeeping plays an important role in space exploration and in surface exploration. For example, in an Earth-to-Mars space expedition, timekeeping is important to be able to accurately time the occurrence of certain events, such as the launch time of a rocket, the landing time of a lander, etc. Such timekeeping is not only of importance on the destination terrestrial planet itself, e.g., on Mars, but also on Earth, for example in a mission control room. With respect to surface exploration, the local time of day on a terrestrial planet constitutes important information when exploring the surface of the terrestrial planet, which may be, for example, on Mars, on Earth, or on another terrestrial body (e.g., Moon, Mercury, Venus).

It is desirable to provide such functionality for space exploration and/or surface exploration in a wearable timekeeping device, i.e., in a watch, to enable the wearer to always be able to access such functionality irrespective of his/her location.

The Omega Skywalker X-33 watch provides functions for space exploration. For example, the watch is said to track mission elapsed time (MET) and phase elapsed time (PET). Mission elapsed time is, for a space mission, the elapsed time since launch. Phase elapsed time can be used to count time down to, or count elapsed time since, an event within MET. For example, phase elapsed time can be used to set a timer counting down the time until the start of a scientific measurement by a rover on the surface of Mars.

It is also known to provide functions for surface exploration in a portable electronic timepiece. For example, an electronic watch may be equipped with a Global Positioning System (GPS) signal receiver to determine a geolocation of the wearer.

SUMMARY OF THE INVENTION

An object of the invention is to provide an electronic watch with improved functionality for space and/or surface exploration on a terrestrial planet.

A first aspect of the invention provides an electronic watch, comprising:

- a time displaying means for displaying time, wherein the time displaying means is electronically controllable to display a determined time;
- a processor subsystem configured to electronically communicate with the time displaying means and to:
  - maintain a coordinated planetary time (UTC, MTC) which is defined for a prime meridian of a terrestrial planet;
  - obtain longitudinal data, the longitudinal data representing a longitude of interest on the terrestrial planet which is different from the prime meridian;
  - determine a local true solar time, LTST, at the longitude of interest as a function of the coordinated planetary time and using an equation of time which accounts for orbital eccentricity and rotational axis tilt of the terrestrial planet; and
  - control the time displaying means to display the LTST.

The electronic watch, being a wearable timekeeping device, comprises time displaying means for displaying time. The time displaying means are electronically controllable in that a processor subsystem of the watch may be able to control which time is displayed, or at least be able to set the time to a specific time, from which point onwards the time may start incrementing outside of the direct control of the processor subsystem. Such time displaying means are known per se, and may take various forms, such as 'analog' clock faces with physical hour hands and physical minute hands as well as electronic displays which may display the time digitally, i.e., as numerical digits and/or as a digital representation of an analog clock face. The electronic watch may also comprise several time displaying means, e.g., an analog clock face which is electronically controllable and one or more electronic displays.

The processor subsystem of the electronic watch may comprise one or more processors, which may also be referred to as 'embedded' processor(s). The processor(s) may be configured by software, or alternatively may represent a hardware implementation of such software, to perform various functions, which at least includes controlling the time displaying means to display a particular time, e.g., using an internal interface between the processor subsystem and the time displaying means.

In accordance with the invention as claimed, the processor subsystem may be configured to maintain a coordinated planetary time which is defined for a prime meridian of the terrestrial planet. Such coordinated planetary times are known for various terrestrial planets but may also be defined for terrestrial planets which do not yet have a defined coordinated planetary time. For example, for Earth, Coordinated Universal Time (UTC) is a coordinated planetary time which is defined as the mean solar time (within about one second) at Earth's prime meridian, i.e. at 0° longitude (the Greenwich meridian). Another example is that for Mars, Coordinated Mars Time (MTC) is a proposed Mars standard analogue to Earth's UTC. MTC is defined as the mean solar time at Mars' prime meridian, which passes through the center of the Airy-0 crater, in Terra Meridiani. MTC is sometimes also denoted as Airy Mean Time (AMT).

The processor subsystem may maintain this coordinated planetary time in various ways, for example by setting a software and/or hardware-based internal clock to the coordinated planetary time or by storing a time offset by which the coordinated planetary time can at any point in time be calculated from a reference internal clock.

The processor subsystem may further be configured to obtain longitudinal data which represents a longitude of interest on the terrestrial planet which is different from the prime meridian. For example, such longitudinal data may define a longitudinal coordinate, e.g., a number of degrees, which represents the longitude of interest.

The processor subsystem may be further configured to determine a Local True Solar Time (LTST) at the longitude of interest as a function of the coordinated planetary time and using an equation of time which accounts for orbital eccentricity and rotational axis tilt of the terrestrial planet. Having determined the LTST, the LTST may be displayed using the time displaying means, for example on a continuous basis or at the request of the user, e.g., when selecting a corresponding function of the electronic watch. Thereby, a user is able to see the LTST at the longitude of interest on his/her electronic watch.

Local true solar time, which is also called apparent time or sundial time, is of particular interest to space exploration and surface exploration, as will be elucidated in the following. Clocks typically display mean solar time, which is the solar time that would be measured by observation if the Sun traveled at a uniform apparent speed throughout the year rather than, as it actually does, at a slightly varying apparent speed due to the orbital eccentricity and rotational axis tilt of the terrestrial planet. For Earth, the prime meridian (0° longitude) passes through the Royal Observatory in Greenwich, London (UK), and UTC coincides with mean solar time there. Time zones typically use one mean solar time, even though the mean solar time will locally vary in the time zone. While such time zones may ideally be defined as a repeating range of longitudes, e.g., exactly 15° wide and centered on successive 15°-multiples of longitude, at 0°, 15°, 30°, etc., this is not the case: Earth time zones can have strange shapes, responding more to commercial and political needs rather than to astronomical common sense. For example, Spain, France, Belgium, the Netherlands, and Algeria should be on the same time zone as the UK. Also, given its meridional position, Bolivia is in the 'correct' time zone, but Argentina and Uruguay are not. As such, mean solar time is inaccurate by being a 'mean' time, in terms of disregarding seasonal variability of the apparent speed of the Sun, but also in terms of the mean solar time being typically used in an entire time zone which includes a range of longitudes and is often latitude-dependent due to the non-regular shapes of many time zones. For most work, using mean solar time and time zones for timekeeping has been universally accepted and is typically sufficient.

However, for space exploration and/or surface exploration, mean solar time and time zones may be unsuitable for timekeeping. There are various reasons for this. One is that for missions on other terrestrial planets, such as Mars, there may not exist a standardized concept of time zones. As such, there may be a need to determine a local solar time at a particular longitude of interest, e.g., a landing site of a Mars lander. Given such a local solar time, LST, various mission events, such as landing, takeoff, etc., may be timed in terms of the LST, e.g., as a time or daytime expressed in LST.

For surface exploration, either on Mars or Earth or on another terrestrial planet, it may also be of interest to determine a 'true' solar time at a particular longitude of interest since this may assist in navigation on the surface. For example, it is known that a clock may be used as a solar compass by pointing the hour hand to the Sun, noting the angle to 12:00, with the approximate North-South direction then being found at the half angle, i.e., in between the hour hand and the 12:00 angle. By determining a local true solar time, LTST, at a specific longitude of interest, such a solar compass may provide higher accuracy when determining the North-South direction than when using a mean solar time for a time zone. This may improve navigational accuracy during surface exploration. In particular, this may allow navigation on terrestrial planets such as Mars which do not have a magnetic field and on which compasses cannot be used and on which Galileo, GPS and similar geolocation systems are unavailable.

The above is illustrated in the specification in an example for the city of Leiden (NL), in which the use of a watch displaying UTC+1 (LMST for the respective time zone) yields a direction which is 10° off from true South. This inaccuracy may be avoided by the electronic watch displaying the LTST for Leiden's longitude (4.50° E).

Optionally, the electronic watch further comprises:

an electronic display;

a user input subsystem for enabling a user to enter data, wherein the electronic display is configured to display feedback of said entering of data;

wherein the processor subsystem is configured to enable the user to indicate the longitude of interest using the user input subsystem.

The user may be enabled to indicate the longitude of interest directly on electronic watch itself, for example by specifying a longitudinal coordinate, e.g., 135.35°, using the user input subsystem. The electronic display may for example be a numerical or alphanumerical display. The user input subsystem may for example comprise one or more buttons, dials, touch sensitive areas, etc.

Optionally, the processor subsystem is configured to receive the longitude of interest from a radio-navigation system, such as a satellite-based navigation system (e.g., Galileo, GPS, GLONASS, etc.). For example, the electronic watch may comprise a radio-navigation receiver which may provide geolocation data to the processor subsystem is indicative of a current longitude of the electronic watch and its wearer.

Optionally, the processor subsystem is configured to enable the user to specify the longitudinal coordinate with a precision of at least 1 or 2 decimal places.

Optionally, time displaying means comprises a clock face, wherein the clock face comprises an hour hand and minute hand, and wherein the processor subsystem is configured to control the time displaying means to display the LTST with the hour hand and minute hand. By displaying the LTST using the clock face, the user is enabled to use the electronic watch as sun compass, e.g., in the aforementioned way of pointing the hour hand to the Sun, noting the angle to 12:00, with the approximate North-South direction then being found at the half angle. Thereby, the user is enabled to more accurately navigate on a terrestrial planet such as Earth or Mars using only the electronic watch. If the LTST were only to be displayed numerically, the user would have to set another clock face to LTST and use the other clock face as sun compass.

Optionally, the clock face comprises a physical hour hand and a physical minute hand. The electronic watch may thus have an analog clock face with physical hands which may be set to LTST and thereby enable the use as sun compass.

Optionally, the time displaying means comprises a display for electronically displaying the clock face with its hour hand and minute hand. The clock face may also be implemented digitally, e.g., as a digital representation of an analog clock face. By setting the hands to LTST, the digital clock face may also be used as sun compass.

Optionally, the electronic watch further comprises a bezel, wherein the bezel is rotatable around the clock face and comprises marks for cardinal directions. Such cardinal directions include 'North', 'South', 'East' and 'West'. The marks may take various forms, for example letters ('N', 'S', 'E', 'W') or symbols. Accordingly, the user may rotate the bezel so that the 'North' mark bisects the angle between the hour hand and the watch's 12 o'clock direction. In the northern hemisphere, the 'North' mark now points approximately due south, and in the southern hemisphere, due north.

Optionally, the processor subsystem is configured for at least one of:

- maintaining coordinated universal time, UTC, on Earth and determine an Earth LTST at an Earth longitude of interest as a function of the UTC; and
- maintaining coordinated Mars time, MTC, on Mars and determine a Mars LTST at a Mars longitude of interest as a function of the MTC.

The electronic watch may be configured to specifically determine LTST for Earth or Mars, namely by maintaining (i.e., keeping time of) a respective coordinated planetary time and determining the respective LTST (Earth or Mars) based on this coordinated planetary time. In some embodiments, the electronic watch may be configured to determine LTST for both planets and may be switchable between displaying Earth-LTST and Mars-LTST. In such a case, the user input subsystem may enable the user to specify a longitude of interest on Earth and on Mars.

Optionally, the processor subsystem is configured to enable the user to indicate the Earth longitude of interest by specifying a planetographic longitudinal coordinate on Earth. For example, the planetographic longitudinal coordinate may be expressed as a value in the range of −180°-180°, with the sign (− or +) denoting west or east, respectively and with 0° corresponding to the prime meridian (Greenwich).

Optionally, the processor subsystem is configured to enable the user to indicate the Mars longitude of interest by specifying a planetocentric longitudinal coordinate on Mars. For example, a planetocentric longitudinal coordinate may be expressed as a value in the range of 0°-360°.

Optionally, processor subsystem is configured to enable the user to indicate a number of leap seconds for the UTC. This may improve the accuracy of determining the Earth LTST based on the UTC.

Optionally, the processor subsystem is configured to:

- enable the user to indicate an event on Mars as an Earth datetime;
- convert the Earth datetime to a Mars datetime which is expressed as a Mars local solar time and Mars sol date at the Mars longitude of interest; and
- determine a relative datetime metric and make the relative datetime metric selectable for display, wherein the relative datetime metric is indicative of a difference between the Mars datetime and a current Mars datetime.

The electronic watch may thereby support an Earth-to-Mars space expedition in which both Earth daytimes and Mars datetimes may be used. In particular, an event on Mars may be specified as an Earth datetime, i.e., a date and the time, which may then be converted to a Mars datetime in the form of a local solar time, i.e., either local true solar time or local mean solar time, and a Mars sol date. The electronic watch may then determine a relative datetime metric which may be indicative of a difference between the Mars datetime and a current Mars datetime, and make this relative date time metric selectable for display. For example, the electronic watch may provide a countdown to an event which occurs in the future, or show elapsed time to an event which occurred in the past, in a relative date time metric which is associated with Mars in that it is indicative of a difference in current and determined Mars datetimes.

Optionally, the processor is configured to determine, as or as part of the relative datetime metric, a mission sol number which indicates the number of sols relative to the Mars sol date. For example, the electronic watch may show the number of Mars sols relative to a takeoff, landing or rover exploration start on Mars.

Optionally, the processor subsystem is configured to increment the mission sol number at midnight Mars local true solar time.

BRIEF DESCRIPTION OF THE DRAWINGS

These and other aspects of the invention are apparent from and will be elucidated with reference to the embodiments described hereinafter. In the drawings.

Figure 1:
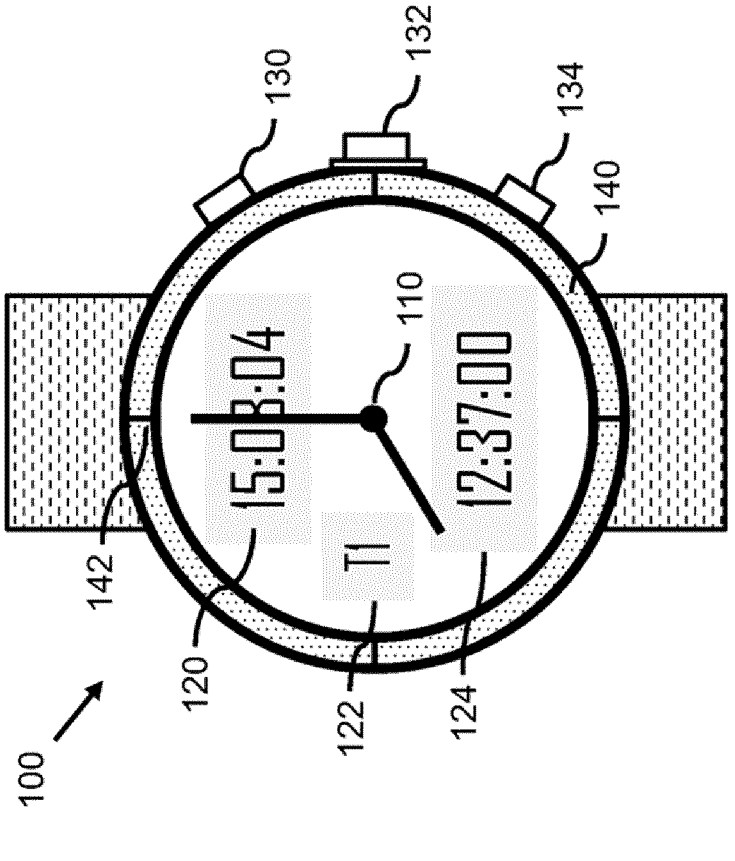
FIG. 1 shows an electronic watch having electronic displays, an analog clock face, a number of buttons and a rotatable bezel with marks for cardinal directions.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

100 electronic watch
110 analog clock face
120-124 electronic display
130-134 button
140 bezel
142 cardinal mark (north)
200 processor subsystem
210 user input subsystem
220 user input interface
230 user input elements
240 electronic display controller
250 electronic display(s)
260 analog clock face controller

270 analog clock face
300 longitude of interest, edit mode
310 increment value by button press
312 confirm entry, move to next digit/entry field by button press
314 decrement value by button press
320 adjusted longitude of interest
400 year sol number (1-668)
402 selected mars time: m1 or m2
404 mission time in 24 h mode
410 switch from page 1 to page 2 by button press
420 longitude of interest
422 day of week
424 mission sol number
500 equation of time of Earth
510 time (days)
520 time difference (min)
530 component due to axis of rotation tilt
532 component due to orbital eccentricity
534 sum of components
550 analemma of Earth
560 time difference (min)
570 true sun declination (degrees)
580 component due to axis of rotation tilt
582 component due to orbital's eccentricity
584 sum of components
600 equation of time of Mars
610 time (sols)
620 time difference (min)
630 component due to axis of rotation tilt
632 component due to orbital's eccentricity
634 sum of components
650 analemma of Mars
660 time difference (min)
670 true sun declination (degrees)
680 component due to axis of rotation tilt
682 component due to orbital's eccentricity
684 sum of components
700 sun
710 analog clock face set to local true solar time
712 cardinal mark on rotatable bezel
720 angle between hour hand and 12 o'clock
730 south (north) direction

DETAILED DESCRIPTION OF EMBODIMENTS

FIG. 1 shows an electronic watch 100 in accordance with some examples. The electronic watch 100 is shown to comprise time displaying means for displaying time in the form of electronic displays 120, 124 and in the form of an analog clock face 110 having an hour hand and a minute hand. The electronic displays 120, 124 are shown to be numerical displays in that they are capable of displaying at least numerals. In some examples, one or more the electronic displays 120, 124 may be alphanumerical displays which are capable of displaying both letters and numerals and/or other graphic symbols. The electronic watch 100 is further shown to comprise a further electronic display 122 which may be an alphanumerical display for displaying a currently selected mode of the electronic watch 100. In general, the time displaying means may be electronically controllable by a processor subsystem of the electronic watch 100 to display a determined time. For example, the hands of the clock face 110 may be controllable to assume the determined time, and one or more of the electronic displays 120, 124 may be controllable to display the determined time.

In some examples, the electronic watch 100 may comprise either one or more electronic displays or an analog clock face. In some examples, the electronic watch 100 may comprise an electronic display on which time may be displayed via a digital representation of an analog clock face and/or as a numeric representation.

The electronic watch 100 is further shown to comprise a number of buttons 130, 132, 134 via which a user may control aspects of the operation of the electronic watch 100. Several aspects of the operation will be elucidated further onwards.

The electronic watch 100 is further shown to comprise a bezel 140 which may comprise one or more marks for one or more of the cardinal directions. In the example of FIG. 1, the bezel 140 shown to comprise marks for each of the cardinal directions, namely 'North', 'South', 'East', 'West', with the cardinal direction for 'North' being indicated by the reference numeral 142. The bezel 140 may be rotatable around the clock face, which may help in using the electronic watch 100 as a sun compass.

Figure 2:
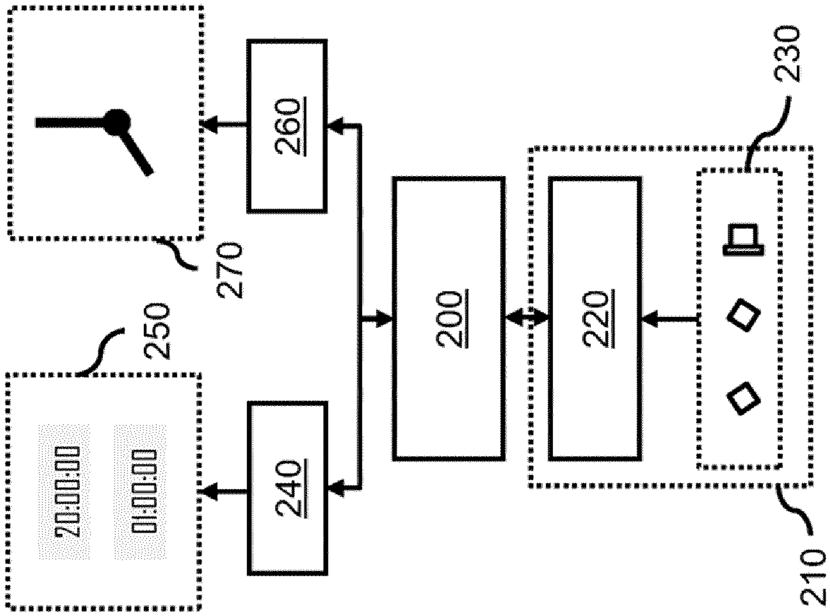
FIG. 2 schematically illustrates operation of the electronic watch.

FIG. 2 schematically illustrates operation of the electronic watch. In particular, FIG. 2 shows a processor subsystem 200 of the electronic watch. The processor subsystem 200 may comprise one or more microprocessors or microcontrollers (both not separately shown) which may execute appropriate software implementing at least some or all of the described operations of the electronic watch. In some examples, the electronic watch may comprise a memory for storing the software (not shown in FIG. 2). In other examples, the processor subsystem 200 may be implemented by programmable hardware, such as a FPGA, or by non-programmable hardware, such as an ASIC, or by any other type of integrated circuit.

In the example of FIG. 2, the processor subsystem 200 is shown to communicate with an electronic display controller 240 which is configured to control one or more electronic displays 250 via respective data communication, and with an analog clock face controller 260 which is configured to control an analog clock face 270 via respective data communication. In some examples, the electronic watch may either comprise one or more electronic displays or one or more analog clock faces.

The electronic watch may further comprise a user input subsystem 210 for enabling a user to control at least part of the operation of the electronic watch. In the example of FIG. 2, the user input subsystem 210 is shown to comprise a user input interface 220 and one or more user input elements 230, being in this example the buttons 130, 132, 134 of FIG. 1. In general, the user input elements 230 may take any suitable form, such as one or more buttons, dials, touch sensitive surfaces, a microphone, a camera, etc. The user input interface 220 may be an electronic interface, e.g., established using a microcontroller, which may match the type of user input device. For example, the electronic interface may comprise a data bus.

The electronic watch of FIGS. 1 and 2 may be configured to support space exploration and/or surface exploration on a terrestrial planet. For that purpose, the processor subsystem 200 may be configured to electronically communicate with the time displaying means 250, 270 and to:

- maintain a coordinated planetary time (UTC, MTC) which is defined for a prime meridian of a terrestrial planet;
- obtain longitudinal data, the longitudinal data representing a longitude of interest on the terrestrial planet which is different from the prime meridian;

determine a local true solar time, LTST, at the longitude of interest as a function of the coordinated planetary time and using an equation of time which accounts for orbital eccentricity and rotational axis tilt of the terrestrial planet; and control the time displaying means to display the LTST.

The above operation steps will be elucidated further onwards.

With continued reference to FIG. 2, the processor subsystem 200 may be configured to enable the user to indicate the longitude of interest using the user input subsystem 210 and to display feedback of the entering of the data on the electronic display 250. In an alternative example, the electronic watch may obtain the longitudinal data from elsewhere, e.g., from a Galileo or GPS-based receiver (not shown in FIG. 2) which may, but does not need to be, part of the electronic watch.

In general, the electronic watch as described in this specification may in some examples implement a number of astronomical functions to calculate and display time monitoring information which may be useful for conducting Earth-Mars space missions. However, these functions may also be used in everyday life on Earth and/or on Mars or on another terrestrial planet. Although the following refers to Mars as an exemplary terrestrial planet, it equally applies to other terrestrial planets such as Venus and Mercury, mutatis mutandis. In some examples, the electronic watch may implement a number of functions which may include but are not limited to:

For Earth: Coordinated Universal Time (UTC)

Local Mean Solar Time (LMST) for time zones

Local True Solar Time (LTST) at surface location/longitude

Mission elapsed time in terrestrial (Earth) days

For Mars: Coordinated Mars Time (MTC)

LMST at surface locations (or time zones)

LTST at surface location(s)/longitudes

Mission elapsed time in sols (Martian days)

Solar longitude (Mars orbital position)

Year sol number (Mars date)

In particular, in some examples, the electronic watch may provide the following functionality in relation to timekeeping on or for Mars, in particular by the processor subsystem of the electronic watch being configured for:

Calculating and displaying MTC from UTC. For example, the processor subsystem of the electronic watch may calculate, on the basis of Earth's UTC, a corresponding Mars orbital and rotational ephemerides, which in turn may be used to calculate and display MTC. The MTC may be provided on the watch's electronic display and may also be shown by the hands of the watch's analog clock face.

Calculating and displaying LMST at a specific location on Mars taking as input the location's planetocentric longitude. For example, the processor subsystem of the electronic watch may translate the MTC LMST value for the Mars prime meridian onto a specific location's meridian using a longitude coordinate provided by the user. The LMTS (also referred to as Mars-LMTS) may be shown the watch's electronic display and may also be shown by the hands of the watch's analog clock face.

Calculating the Mars equation of time to display LTST taking as input the location's planetocentric longitude. For example, the processor subsystem of the electronic watch may compute the 'Mars equation of time' to determine LTST at the location where previously LMST had been computed. The equation of time may account for the effect that Mars' orbital eccentricity and variations in rotational axis attitude (precession and nutation) have on the specific location's time throughout a Martian year. The LTST (also referred to as Mars-LTST) may be shown the watch's electronic display and may also be shown by the hands of the analog clock face.

Calculating and displaying Mars solar longitude (orbital position around the Sun). For example, the processor subsystem may track Mars' orbital position throughout the year and may display the information as a value between 0°-360°. With this information, the user may follow the evolution of the canonical seasons (spring, summer, fall and winter) and of the statistically indicated dust storm season.

Calculating and displaying Mars year sol number (proxy for date on Mars). For example, the processor subsystem of the electronic watch may calculate and display the sol number count (0-668) in a Mars year. This may be the equivalent of an Earth date for Mars, for which there are no months defined yet.

Calculating and displaying a mission's sol number count (sols since landing). For example, the processor subsystem may calculate and keep track of the number of sols since a mission's touchdown at a given Mars location.

Calculating and displaying a number of mission phase countdown timers and alarms based on Mars time bases. This may be an adaptation of timer functions described in U.S. Pat. No. 7,688,682 B2 so they can also be used with Mars time bases. U.S. Pat. No. 7,688,682 B2 is hereby incorporated by reference in respect of these timer functions.

It will be appreciated that the above functions may also be provided for terrestrial planets other than Mars and Earth on the basis of the present disclosure.

In some examples, the electronic watch may provide the following functionality in relation to timekeeping on or for Earth, in particular by the processor subsystem of the electronic watch being configured for:

Calculating the Earth equation of time to display LTST taking as input the location's East-West longitude. For example, the processor subsystem may compute the 'Earth equation of time' to determine LTST at a specific location's meridian using a longitude coordinate provided by the user. The equation of time may account for the effect that Earth's orbital eccentricity and variations in rotational axis attitude (precession and nutation) have on the specific location's time throughout an Earth year. The LTST (also referred to as Earth-LTST) may be shown on the watch's electronic display, and may also be shown by the hands of the watch's analog clock face.

The following describes the above and further functions of the electronic watch in more detail. These functions may be implemented by the electronic watch by the processor subsystem together with the user inputs subsystem and the time displaying means. In some examples, the electronic watch may implement only some of these functions, e.g., a single function or a subset of the functions.

Earth Time Zones (T1 & T2)

The electronic watch may enable a user to configure two time zones T1 and T2, which may trigger the electronic watch to keep time for these two time zones. The time zones T1 and T2 may be defined as time differences relative to UTC.

Leap Seconds for UTC

The processor subsystem of the electronic watch may be configured to enable the user to indicate a number of leap seconds for the UTC. For example, the user may be enabled to enter a total number of leap seconds in the range 0-255.

Coordinated Mars Time (MTC)

Coordinated Mars Time (abbreviated MTC) is a proposed Mars standard analogue to Earth's UTC. MTC is defined as the mean solar time at Mars' prime meridian (0° longitude), which passes through the center of the Airy-0 crater, in Terra Meridiani. MTC is sometimes also denoted as Airy Mean Time (AMT).

At present, Mars' axial inclination and rotation period are similar to Earth's. The duration of a Mars solar day (called "sol") is 24 h 39 m 35.244 s (the corresponding value for Earth is 24 h 00 m 00.002 s). Thus, a Mars sol is approximately 2.7% longer than an Earth day. A sol is divided into 24 Mars hours of 60 Mars minutes each.

It is possible to define 'Mars time zones', e.g., as being 15° wide, centered on successive 15°-multiples of longitude, at 0°, 15°, 30°, etc. By knowing in which Mars time zone a rover or a landmark is located, one may have an idea of the approximate mean solar time there. For example, Olympus Mons, the largest volcano in the Solar System, lies at 133.8° W. If 133.8° W is divided by 15°, one obtains 8.9. Hence, an astronaut standing on the rim of the Olympus Mons caldera could set his or her watch to Mars time zone MTC-9 (that is, nine hours ahead of MTC). MTC-based time zones have yet to be employed for Mars time keeping, but this may change in the near future Another important piece of knowledge for Mars missions is date; or more accurately, Mars' position in its orbit around the Sun. On Earth, the well-known 365-day calendar is used which consists of 12 months. A Martian year, however, is 668.59 sols long. Whereas an Earth year can be divided into 52 seven-day weeks, a Mars year spans 95 seven-sol weeks. Since no Martian months have been agreed yet, scientists use Solar Longitude ($L_s$) to mark the passage of time within a Mars year. For all planets, seasons begin at 90° $L_s$ intervals, on equinoxes and solstices:

| Solar Longitude ($L_s$) | Northern Hemisphere | | Southern Hemisphere | |
|---|---|---|---|---|
| 0° | vernal equinox | spring | autumnal equinox | autumn |
| 90° | summer solstice | summer | winter solstice | winter |
| 180° | autumnal equinox | autumn | vernal equinox | spring |
| 270° | winter solstice | winter | summer solstice | summer |

Because Mars' orbit has higher eccentricity than Earth's (it is more elliptical), the seasons are not of equal length. Aphelion, the distance furthest from the Sun (249 million km), where Mars moves most slowly, occurs at $L_s$=70°. Perihelion, the point closest to the Sun (207 million km), when Mars moves fastest, happens at $L_s$=250°. The near coincidence of aphelion with the northern summer solstice results in a temperate northern hemisphere climate. The southern hemisphere, on the other hand, has short and relatively hot summers, but winters are long and very cold. The period during which Mars dust storms are most likely to occur begins at $L_s$=180° and ends at around $L_s$=325°. This is a critical time for missions that rely on solar panels for obtaining electrical energy, as dust uplifted into the atmosphere during a storm can obscure sunlight for weeks. Global scale dust storms are relatively rare, but their atmospheric effects can last for months; the last ones occurred in 2001, 2007, 2018.

Uses of Coordinated Mars Time (MTC)

On Mars, the MTC function of the electronic watch may provide a useful overview of Mars' orbital status. For that purpose, the electronic watch may display the sol date, the season (solar longitude) and the time at the prime meridian. Although in principle it would be possible to synchronize Mars activities using MTC, in reality, since most actions performed on or near Mars are commanded from Earth, UTC is usually employed by ground control instead. However, MTC may constitute a practical time basis for calculating mean solar time at different locations on the Martian surface. See also the electronic watches functionality to maintain Mars time at two surface positions (M1 & M2). On Earth, as has been the case on previous Mars surface missions, a mission's operations team may also begin their activities working on 'Mars time'.

Local Mean Solar Time (LMST)

The electronic watch may enable a user to configure Mars time at two surface positions, e.g., at two longitudes, using respective modes M1 and M2. Mars missions do not yet set their clocks to time zones. Instead, it is common practice to define 'Mars mission time' to be the mean solar time at the intended touchdown location, that is, a Local Mean Solar Time (LMST or Mars-LMST). LMST may be calculated for the indented touchdown location, or any other longitude of interest, as follows. Here, as landing point, Oxia Planum is assumed, having planetographic coordinates 18.159° N, 24.334° W. MTC is defined as the mean solar time at 0° longitude, i.e., the Mars prime meridian. Since the landing site lies at 24.334° W, the mean solar time there will be advanced relative to MTC; thus, a negative offset is to be applied. Landmarks due east of the prime meridian require a positive offset.

The LMST for a given planetographic longitude, $\Lambda_{pg}$, in degrees west, is:

$$LMST=MTC-\Lambda_{pg}\ (24\ h/360°).\ \text{Therefore,}$$
$$LMST_{ExoMars}=MTC-(24.334°\times 24\ h/360°)$$
$$=MTC-1.622\ h=MTC-1\ h\ 37\ m\ 20.1\ s.$$

During use on Mars, a user may set M1 to be the user's local Mars time, i.e., LMST at the user's longitude. M1 may be displayed using the analog clock face. M2 may be configured to show a second Mars time, for example, that of another mission. On Earth, members of the mission operations team may set M1 to follow the mission clock, but may keep the analog clock face displaying the Earth time T1.

M1 and M2 may be used as actual Mars mission functions. To program these timers, the user may provide two input parameters: landing site longitude (or in general latitude of interest) and landing date (or in general an event date). The electronic watch may enable a user to input such and other types of input data.

Figure 3:
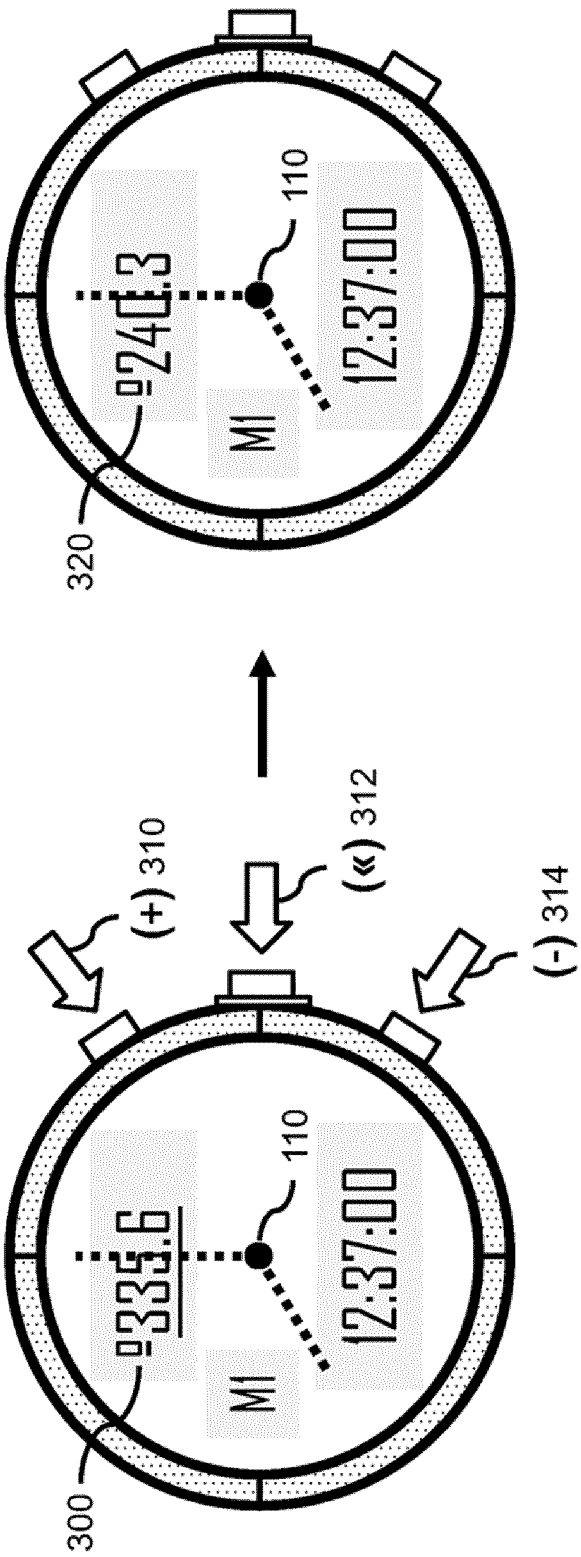
FIG. 3 illustrates entering a longitude of interest on the electronic watch.

FIG. 3 illustrates, by way of example, entering a longitude of interest on the electronic watch. As shown on the left-hand side, in an edit mode, a current longitude of interest may be shown, e.g., 335.6°, with the underlining indicating that the watch is in edit mode. A user may then increment a currently entered value by pushing the respective button indicated by the reference numeral 310, decrement a currently entered value by pushing the respective button indicated by the reference numeral 314, and confirm entry by pushing the respective button indicated by the reference numeral 312. In one example, the user may edit the longitude of interest on a per digit basis, i.e., by first adjusting and confirming the first digit of the entered value, then adjusting and confirming the second digit of the entered value, then adjusting and confirming the third digit of the entered value, and finally adjusting and confirming the first decimal place of the entered value. In another example, the user may enter the longitude of interest by incrementing and decrementing and then confirming the entry of the entire value. As shown on the right-hand side of FIG. 3, this may result in an adjusted longitude of interest 320 having been entered, e.g., 240.3°. It will be appreciated that in some examples, the user may also directly enter a longitude of interest without adjusting a previously entered longitude of interest, e.g., by starting from 0° or 'nothing'.

In general, the processor subsystem may be configured to enable the user to indicate the longitude of interest by specifying a longitudinal coordinate using the user input subsystem. For example, the processor subsystem may be configured to enable the user to specify the longitudinal coordinate with a precision of at least 1 or 2 decimal places. In general, the processor subsystem may be configured to enable the user to indicate an Earth longitude of interest by specifying a planetographic longitudinal coordinate on Earth, e.g., in the range of −180° to +180°, or specifically in degrees west (−180° to 0°) or east (0° to +180°) with respect to the prime meridian. The processor subsystem may also be configured to enable the user to indicate a Mars longitude of interest by specifying a planetocentric longitudinal coordinate on Mars. The 1970 International Astronomical Union (IAU) adopted the convention that longitude should increase in the direction of rotation. For planets rotating directly, like Mars, this results in longitude being measured from 0° to 360° eastward from the prime meridian.

With continued reference to FIG. 3, the user may be requested to, in order to set mission time, input the landing site's planetocentric longitude, $\Lambda_{pc}$ in degrees east. Configuring local time using a position's longitude provides a great deal of operational flexibility. For example, if ground control were to revise the mission clock, e.g. as a result of the actual touchdown point being elsewhere than initially planned, a user may simply enter a new longitude and the electronic watch may calculate the correct mean solar time for the new landing location.

In case a user wishes to program M1 or M2 to work on a given Mars time zone, instead of a specific longitude of interest, the user may specify the corresponding time zone's center longitude. This may be easily calculated. The following provides two examples, one due west of the prime meridian, the other due east.

In a first example, M1 may be programmed for the Olympus Mons time zone. It was shown previously that Olympus Mons lies on MTC-9. Since every time zone may be centered on its respective 15° meridional band, the MTC-9 center longitude is $\Lambda_{pc}$=360°−9×15°=225° E. In a second example, M2 may be programmed for Curiosity rover's time zone. Touchdown occurred at 4.59° N, 137.44° E. If the user wishes to program the watch to work on mission time, the user may enter 137.44° E. However, if the user wishes to program the watch to work on a corresponding time zone, one may compute, as before, 137.44° E/15°=9.16, which can be rounded down to 9. Thus, Curiosity's landing site is in time zone MTC+9. For MTC+9 the correct band longitude is 9×15° E. Therefore, $\Lambda pc_{MTC+9}$=135.00° E.

It is noted that the electronic watch may provide the user with the possibility to check the longitude assigned to M1 or M2 by entering the mode shown in FIG. 3.

With continued reference to the entering of input data: to establish the mission sol number, a user may set the UTC landing date using the user interface subsystem. The processor subsystem may designate the corresponding sol on Mars as 'mission sol 1", independently of the local landing time, and may consider sol 2 to start begin at the landing site's mean solar time 00:00:00 on the subsequent sol. It is noted that alternatively, the touchdown sol may be considered as 'mission sol 0". In such cases, the UTC landing date as programmed into M1 (or M2) may be incremented by one day. A user may also choose not to enter a UTC landing date, in which case the electronic watch may report the solar time at the longitude which was programmed.

Figure 4:
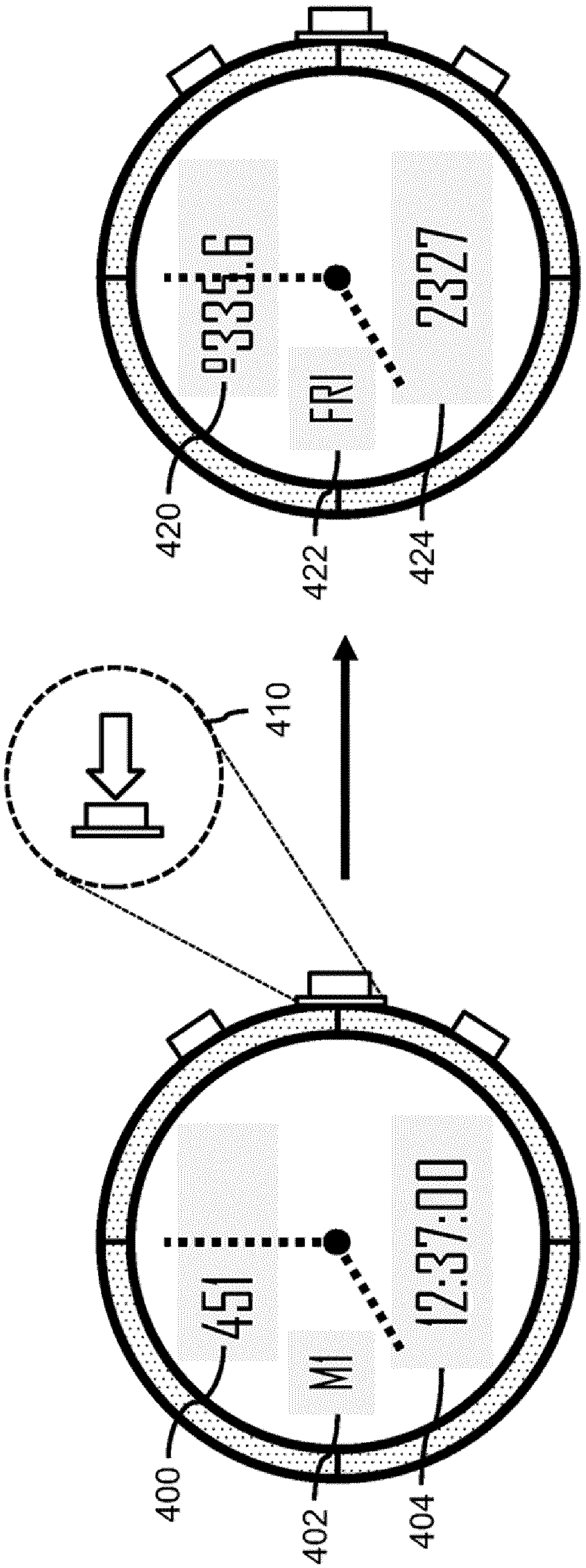
FIG. 4 illustrates various functions of the electronic watch, which include displaying year sol number, mission time, longitude of interest and mission sol number.

FIG. 4 illustrates various functions of the electronic watch, which include displaying year sol number, mission time, longitude of interest and mission sol number and various other types of information. In particular, the electronic watch may be configured to display different information in different "pages" in which the electronic display (s) display different information items. A user may be enabled to switch between these pages using the user input subsystem. For example, as shown in the left-hand side of FIG. 4, the electronic watch may display year sol number as a value from 1 to 668 (reference numeral 400) being '451', the selected mars time (reference numeral 402) being 'M1' and the mission time in 24 h mode (reference numeral 404) being '12:37:00'. A user may switch from page 1 to page 2 by button press (reference numeral 410). On page 2, the electronic watch may display the longitude of interest (reference numeral 420) being '335.6°', the day of the week (reference numeral 422) being 'Fri(day)', and the mission sol number (reference numeral 424) being '2327'.

Other functionality of the electronic watch may relate to the timing of events on Mars, or in general, on another terrestrial planet than Earth. For example, the processor subsystem of the electronic watch may be configured to:

enable the user to indicate an event on Mars as an Earth datetime;

convert the Earth datetime to a Mars datetime which is expressed as a Mars local solar time and Mars sol date at the Mars longitude of interest; and determine a relative datetime metric and make the relative datetime metric selectable for display, wherein the relative datetime metric is indicative of a difference between the Mars datetime and a current Mars datetime.

For example, the processor subsystem may be configured to determine, as or as part of the relative datetime metric, a mission sol number which indicates the number of sols relative to the Mars sol date. The processor subsystem may be configured to increment the mission sol number at midnight Mars local true solar time.

The following explains aspects of the above functionality in more detail with reference to the functions 'Mission Elapsed Time' and 'Phase Elapsed Time'. In this respect, it is noted references to 'time' includes a datetime. As such, elapsed or remaining time may be expressed in hours, seconds, etc., but also in days or sols.

Mission Elapsed Time (MET)

The function MET may display the remaining time until, or elapsed time since, start of an event, and more specifically, the start of a mission. The remaining time may be identified by a '−' prefix to the time, while the elapsed time may be identified by a '+' prefix to the time. The MET may be expressed in Earth days and time, and may be specified using UTC, T1, or T2. The electronic watch may in some example sound an alarm when the event is reached. The alarm may for example be a visual alarm and/or an auditory alarm, as may be generated by a piezoelectric speaker or similar sound generating element which may be part of the electronic watch.

The function MET may be used on Earth to keep track of the time until and since the beginning of an (important) event. This may for example be the initiation and subsequent development of a journey, the submission of an assignment and the period until receiving feedback, etc. The user may typically select T1 (local time) as reference time with respect to which the remaining and/or elapsed time should be calculated. MET may be of fundamental importance for space missions, which are typically journaled with respect to their launch. As the project team may work in triple shifts to integrate the spacecraft elements, verify all systems, complete launch campaign tasks, and fuel the rocket, the clock ticks: T-20 days, T-6 days, . . . Immediately after launch, mission milestones (e.g. solar panel deployment, main engine orbital burns and release into interplanetary trajectory) may be recorded as T+h, m, s. During cruise, mission duration may be tallied as T+XX days since launch using UTC as time reference.

The function MET may be used on Mars to, in addition to the functions M1 (and M2) which may be configured to keep track of mission sol number, to further track the mission in Earth days. Thus, for Mars missions, MET may be programmed with UTC as reference to provide useful and complementary information to M1.

Phase Elapsed Time (PET)

The function PET may provide a special type of timekeeping, and in some cases an associated alarm functionality. When PET is selected, the electronic watch may display the remaining time (−) until, or elapsed time (+) since, an event. PET may be programmed either according to MET (specifying an interval in days and hours) or to a user-defined date and time (in UTC, T1, T2, MTC, M1, M2, or MLs).

The PET function may allow considerable flexibility regarding how events are designated. The following table summarizes possible input parameters.

| PET Mode | Programming data |
|---|---|
| PET MET | Earth date and time offset compared to the mission time (MET) |
| PET UTC | Earth: Count to and since a UTC date and time |
| PET T1 | Earth: Count to and since a T1 date and time |
| PET T2 | Earth: Count to and since a T2 date and time |
| PET MTC | Mars: Count to and since an MTC sol number and time |
| PET M1 | Mars: Count to and since an M1 sol number and time |
| PET M2 | Mars: Count to and since an M2 sol number and time |
| PET MLs | Mars: Count to and since a Mars solar longitude value |

The function PET may be used on Earth to sound an alarm at a certain time after the beginning of an event programmed in MET. In this case, the PET function may behave like an alarm relative to another alarm. For example, if a user would need to prepare a test sample and ship it to an industrial partner on a given date, the user may program an alarm and timekeeping relative to this event using the MET function. The user may also be reminded to check that the test sample has arrived safely a week later by setting a seven-day count using the PET function relative to the MET datetime.

For space missions, the PET function may be used to count time to and/or from events specified in terms of mission elapsed time since launch. On Mars itself, PET may be set to count time to and/or since an event using a Mars time base.

The electronic watch may further provide a MLs (Mars solar longitude) mode. The beginning of the statistical dust storm season begins at $L_s$=180° and ends around $L_s$=325°. The PET function may be used in MLs mode to count the number of sols to the beginning of the statistical dust storm season. For example, the PET function may be used to determine until when a rover may operate on Mars' surface.

In general, the PET timer may be programmed by a user relative to the datetime programmed for MET, but also relative to a separately input datetime.

Local True Solar Time (LTST)

As described elsewhere, the electronic watch may calculate local true solar time (LTST) and in some examples may also display the LTST using an analog clock face so as to enable a user to use the electronic watch as a sun compass.

The following provides a background to LTST: the duration of a solar day is not constant. When mechanical clocks started to take over timekeeping from sundials, which had served humanity for centuries, the difference between clock time and sundial time became an issue for everyday life. True solar time (also called apparent solar time) may be defined as the time indicated by the Sun on a sundial (or measured by its noon transit over a preferred local meridian), while mean solar time may be defined as the average thereof, as is typically displayed by well-regulated clocks.

The equation of time describes the difference between true solar time and mean solar time throughout the year. Its shape can be understood as the sum of two sine curves, the first having a period of one year (its amplitude is a function of the planet's orbital eccentricity) and another with a period of half a year (whose amplitude depends on rotational axis inclination). The equation of time would be constant only for a planet with a perfectly circular orbit and zero axial tilt. Another interesting way to look at this effect is to consider a planet's analemma. This plot describes the annual evolution of the Sun's position in the sky as one would see it if one were to set up a stationary camera to take multiple exposures every day at the same mean solar time.

Figure 5B:
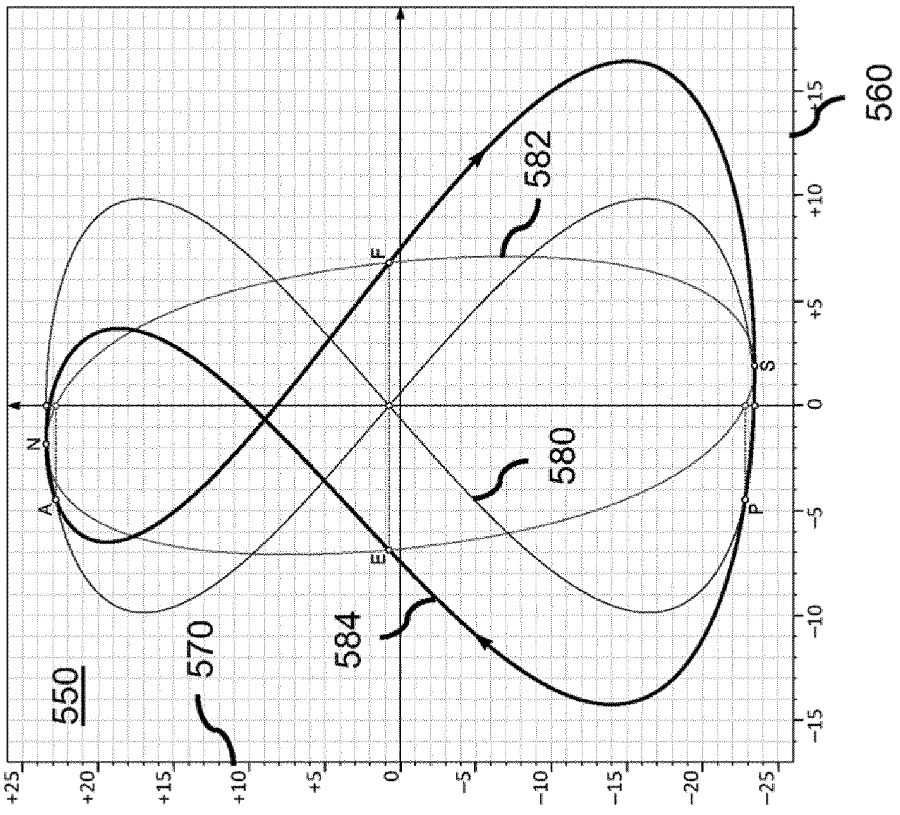
FIG. 5B shows an analemma of Earth with both components.
Figure 5A:
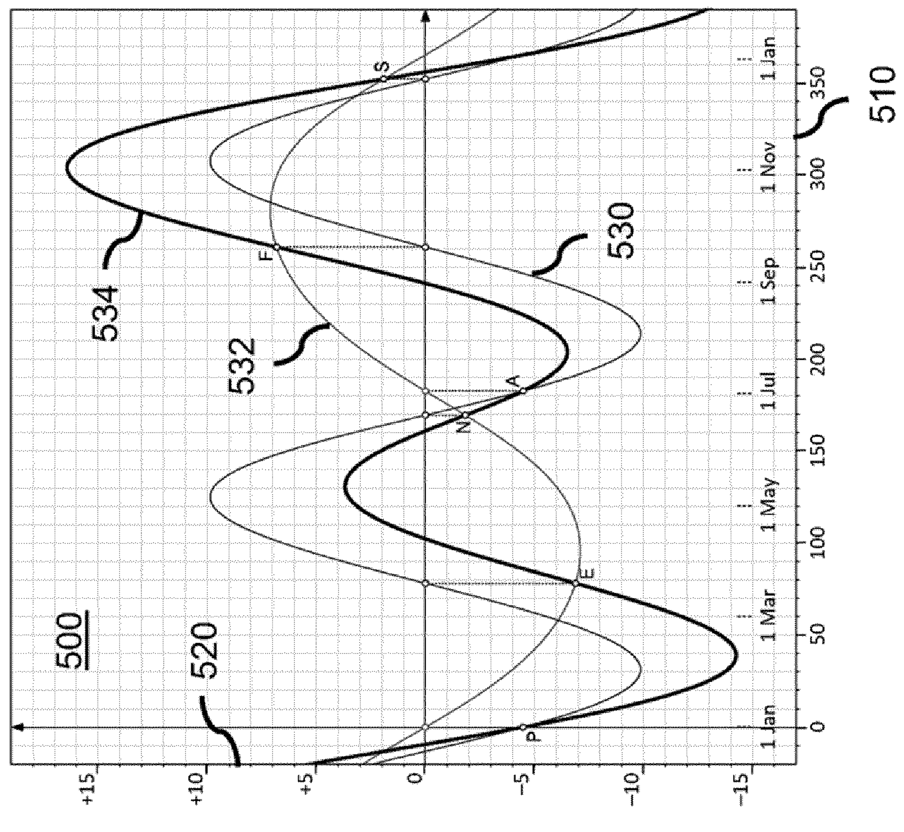
FIG. 5A illustrates an equation of time of Earth, showing a component due to the axis of rotation tilt and a component due to orbit's eccentricity and their sum.
Figure 6A:
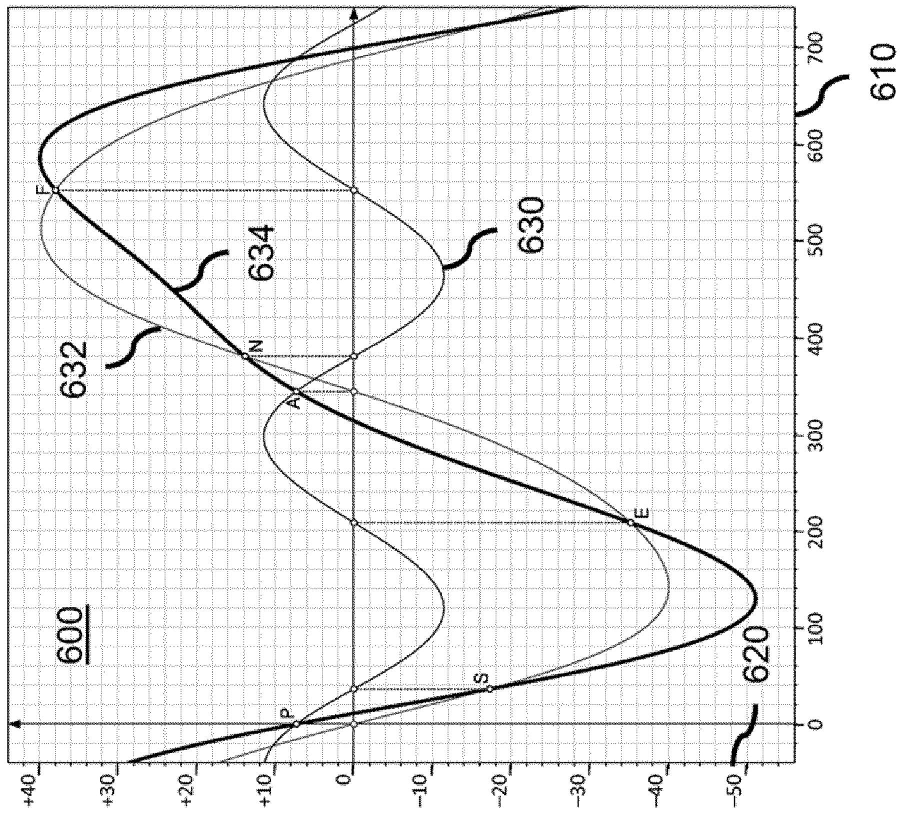
FIG. 6A illustrates an equation of time of Mars, showing a component due to the axis of rotation tilt and a component due to orbit's eccentricity and their sum.
Figure 6B:
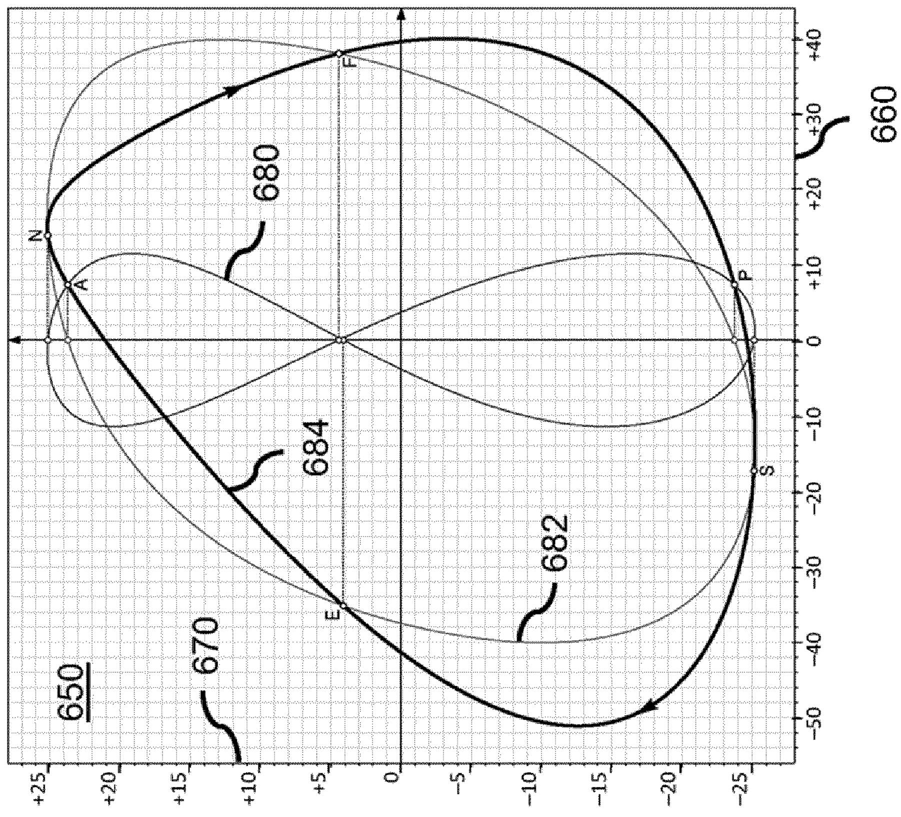
FIG. 6B shows an analemma of Mars with both components.

The following discusses the equation of time and analemma for Earth and Mars with reference to FIGS. 5A-6B. FIG. 5A shows the equation of time 500 of Earth, with the horizontal axis 510 showing the time in days and the vertical axis 520 showing the time difference in minutes. FIG. 5A further shows a first component 530 due to axis of rotation tilt, a second component 532 due to orbital's eccentricity and the sum 534 of both components. FIG. 5B shows the analemma 550 of Earth, with the horizontal axis 560 showing the time difference in minutes and the vertical axis 570 showing the true sun declination in degrees. FIG. 5B further shows a first component 580 due to axis of rotation tilt, a second component 582 due to orbital's eccentricity and the sum 584 of both components. FIGS. 6A and 6B represent FIGS. 5A and 5B but then applied to Mars and with the horizontal axis 610 of FIG. 6A showing the time in sols instead of days.

As one can see from Earth's equation of time 500 in FIG. 5A, true solar time can lag mean solar time by as much as 14 min 6 sec (around 12 February) or be ahead by 16 min 33 sec (around 3 November). The equation of time has zeroes (dates when true solar time and mean solar time coincide) near 15 April, 13 June, 1 September, and 25 December. On Mars, whose orbit has much higher eccentricity than Earth's, the difference between true solar time and mean solar time can reach 50 min, as can be seen in FIG. 6A.

Given these differences, one may understand that a precise solar compass is only provided if the hands of a watch display true solar time at the wearer's location.

It is noted that the equation of time is known per se, for example from the paper "*A Post-Pathfinder Evaluation of Areocentric Solar Coordinates with Improved Timing Recipes for Mars Seasonal/Diurnal Climate Studies*" by Allison, Michael et al., 1999. Namely, the equation of time may be derived by suitably combining the series expansions of equations (4) and (5) in the paper, as per the formula EOT=Alpha(FMS)−Alpha(s) that is shown in the second paragraph of page 219. The Mars equation of time is given as equation (20), while equation (23) specifies how to calculate the local true solar time (LTST) for a given location based on its longitude. The paper is hereby incorporated by reference in as far as pertaining to the calculation of the equation of time and specifically in as far as relating to the cited equations.

Figure 7:
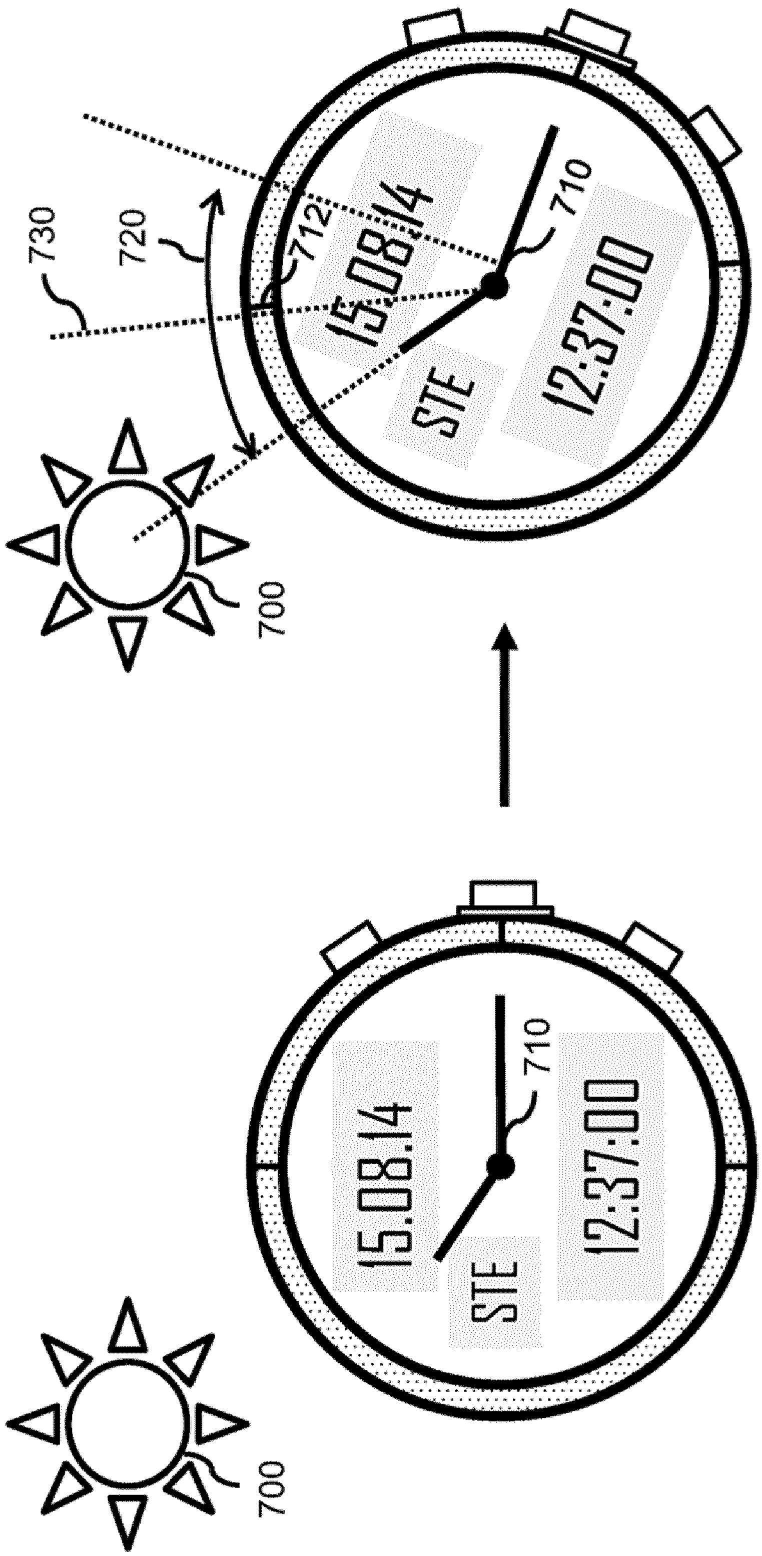
FIG. 7 illustrates the use of the electronic watch as sun compass when displaying the local true solar time using the analog clock face.

FIG. 7 illustrates the use of the electronic watch as sun compass when displaying the local true solar time using an analog clock face. Namely, as shown on the left-hand side of FIG. 7, the electronic watch may display the LTST using the analog clock face 710, being in this example 10:15, in a mode called 'STE' (local true solar time Earth). As shown on the right-hand side of FIG. 7, the user may then rotate the electronic watch so that the hour hand points to the sun 700. This may form an angle 720 between the hour hand and the watch's 12 o'clock direction (1 o'clock when in daylight saving time). The user may then rotate the bezel such that the cardinal mark 712 for north bisects the previous angle 720 (i.e., lies in the middle between the hours hand and the 12 o'clock mark). In the northern hemisphere, the cardinal mark 712 now points approximately south, and in the southern hemisphere, approximately north.

To enable the electronic watch to be used as a sun compass, the processor subsystem of the electronic watch may be configured to control the time displaying means to display the LTST, i.e., the true solar time at the specified longitude of interest, with the hour hand and minute hand. The LTST may be determined and displayed for Earth and/or for Mars and/or for another terrestrial planet. In case the LTST is determined for multiple planets, or for multiple longitudes on one planet, the electronic watch may provide different modes to display the respective LTSTs. For determining Earth LTST, the processor subsystem may be configured for maintaining coordinated universal time, UTC, on Earth and determine an Earth LTST at an Earth longitude of interest as a function of the UTC. For determining Mars LTST, the processor subsystem may be configured for maintaining coordinated Mars time, MTC, on Mars and determine a Mars LTST at a Mars longitude of interest as a function of the MTC.

It will be appreciated that the displaying of LTST instead of LMST using the analog clock face provides improved navigational accuracy, may be illustrated as follows: the city of Leiden (NL) is situated at 4.50° E, in time zone UTC+1. All locations in UTC+1 are assigned the mean solar time corresponding to longitude 15° E. Thus, from a solar point of view, the time shown by a clock in Leiden is off.

The divergence of the LMTS for UTC+1 with respect to the LTST for the city of Leiden (NL), i.e., at 4.50° E, may be calculated as follows:

LMST for a given planetographic longitude, $\Lambda_{pg}$, in degrees west, is: $LMST=UTC-\Lambda_{pg}$ (24 h/360°). Eq. (1):

LMST for a given planetographic longitude, $\Lambda_{pg}$, in degrees east, is: $LMST=UTC+\Lambda_{pg}$ (24 h/360°). Eq. (2):

Using Equation 2, one may determine that a watch in Leiden should read:

$LMST_{Leiden}$=UTC+4.50°×24 h/360°=UTC+0.3 h, or UTC+20 m.

Instead, conventional watches display UTC+60 m. One may therefore conclude that, to properly track LMST, watches in Leiden must be set back 60 m-20 m=40 m. If one wishes to use the watch as an accurate solar compass, one may need to understand the effect that this 40 m offset would have on the hours hand, which is something that most people fail to account for. This can be explained as follows: the hours hand moves a full circle (360°) in 12 h. In one hour, the hour hand sweeps an angle of 360°/12=30°. Hence, 40 m correspond to 40 m×30°/60 m=20° of hour hand movement. This is not a small correction; it is a big one. If one were to use the conventional watch as a solar compass in Leiden using the method described before, i.e., dividing by two the angle formed between the hours hand (pointing to the Sun) and the 12 o'clock direction, the direction will be 10° off from true South. Such inaccuracies may be avoided by displaying the true solar time at a longitude of interest.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An electronic watch, comprising:

a time displaying means for displaying time, wherein the time displaying means is electronically controllable to display a determined time;

a processor subsystem configured to electronically communicate with the time displaying means and to:

maintain a coordinated planetary time (UTC, MTC) which is defined for a prime meridian of a terrestrial planet;

obtain longitudinal data, the longitudinal data representing a longitude of interest on the terrestrial planet which is different from the prime meridian;

determine a local true solar time, LTST, at the longitude of interest as a function of the coordinated planetary time and using an equation of time which accounts for orbital eccentricity and rotational axis tilt of the terrestrial planet; and control the time displaying means to display the LTST.

2. The electronic watch according to claim 1, further comprising:

an electronic display; and a user input subsystem for enabling a user to enter data, wherein the electronic display is configured to display feedback of said entering of data; and wherein the processor subsystem is configured to enable the user to indicate the longitude of interest using the user input subsystem.

3. The electronic watch according to claim 2, wherein the processor subsystem is configured to enable the user to indicate the longitude of interest by specifying a longitudinal coordinate using the user input subsystem.

4. The electronic watch according to claim 3, wherein the processor subsystem is configured to enable the user to specify the longitudinal coordinate with a precision of at least 1 or 2 decimal places.

5. The electronic watch according to claim 1, wherein the time displaying means comprises a clock face, wherein the clock face comprises an hour hand and minute hand, and wherein the processor subsystem is configured to control the time displaying means to display the LTST with the hour hand and minute hand.

6. The electronic watch according to claim 5, wherein the clock face comprises a physical hour hand and a physical minute hand.

7. The electronic watch according to claim 5, wherein the time displaying means comprises a display for electronically displaying the clock face.

8. The electronic watch according to claim 5, further comprising a bezel, wherein the bezel is rotatable around the clock face and comprises marks for cardinal directions.

9. The electronic watch according to claim 1, wherein the processor subsystem is configured for at least one of:

maintaining coordinated universal time, UTC, on Earth and determine an Earth LTST at an Earth longitude of interest as a function of the UTC; and maintaining coordinated Mars time, MTC, on Mars and determine a Mars LTST at a Mars longitude of interest as a function of the MTC.

10. The electronic watch according to claim 9, wherein the processor subsystem is configured to enable the user to indicate the Earth longitude of interest by specifying a planetographic longitudinal coordinate on Earth.

11. The electronic watch according to claim 9, wherein the processor subsystem is configured to enable the user to indicate the Mars longitude of interest by specifying a planetocentric longitudinal coordinate on Mars.

12. The electronic watch according to claim 9, wherein the processor subsystem is configured to enable the user to indicate a number of leap seconds for the UTC.

13. The electronic watch according to claim 9, wherein the processor subsystem is configured to:

enable the user to indicate an event on Mars as an Earth datetime;

convert the Earth datetime to a Mars datetime which is expressed as a Mars local solar time and Mars sol date at the Mars longitude of interest; and determine a relative datetime metric and make the relative datetime metric selectable for display, wherein the relative datetime metric is indicative of a difference between the Mars datetime and a current Mars datetime.

14. The electronic watch according to claim 13, wherein the processor is subsystem configured to determine, as or as part of the relative datetime metric, a mission sol number which indicates the number of sols relative to the Mars sol date.

15. The electronic watch according to claim 13, wherein the processor subsystem is configured to increment the mission sol number at midnight Mars local true solar time.

* * * * *